United States Patent [19]

Yamada et al.

[11] Patent Number: 4,917,460

[45] Date of Patent: Apr. 17, 1990

[54] METHOD AND APPARATUS FOR CONTROLLING LENS OF IMAGE FORMING APPARATUS

[75] Inventors: Shuji Yamada, Hyogo; Hironori Ando, Osaka, both of Japan

[73] Assignee: Mita Industrial Co., Ltd., Osaka, Japan

[21] Appl. No.: 223,479

[22] Filed: Jul. 25, 1988

[30] Foreign Application Priority Data

Jul. 30, 1987 [JP] Japan ................................ 62-193102
Jul. 30, 1987 [JP] Japan ................................ 62-193103

[51] Int. Cl.$^{4}$ ................................................ G02B 7/02

[52] U.S. Cl. .................................... 350/255; 350/320; 355/56

[58] Field of Search ............... 350/429, 430, 255, 320; 355/55, 56, 57, 58, 59; 354/195.1, 402, 404

[56] References Cited

U.S. PATENT DOCUMENTS

| | | | |
|---|---|---|---|
| 4,601,568 | 7/1986 | Takano et al. | 355/56 |
| 4,647,191 | 3/1987 | Kunikawa et al. | 355/56 |
| 4,763,174 | 8/1988 | Makiure et al. | 350/429 |

*Primary Examiner*—Rodney B. Bovernick
*Assistant Examiner*—Loha Ben
*Attorney, Agent, or Firm*—Jordan and Hamburg

[57] ABSTRACT

In a method for controlling a lens of an image forming apparatus, the lens is moved at a high speed from a present position till passing a home position, and thereafter the lens is moved at a low speed in the reverse direction to stop at the home position. Waste of time can be decreased and rapid control of the lens can be achieved by high speed movement of the lens to a position near the home position, and the lens can be precisely stopped at the home position by low speed movement of the lens before stopping.

50 Claims, 16 Drawing Sheets

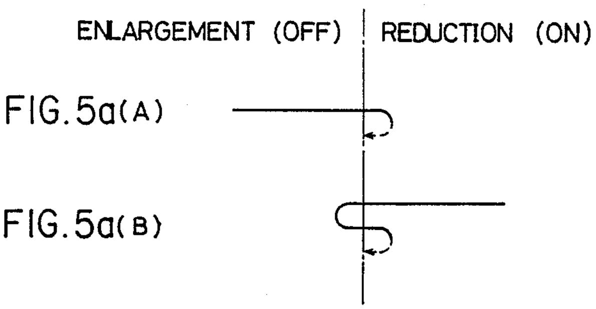
FIG. 5a(A)
FIG. 5a(B)
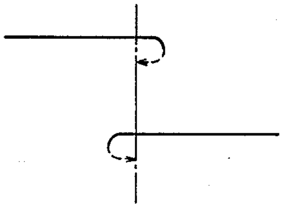
FIG. 5b(A)
FIG. 5b(B)
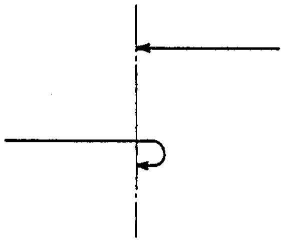
FIG. 5c(A)
FIG. 5c(B)

METHOD AND APPARATUS FOR CONTROLLING LENS OF IMAGE FORMING APPARATUS

BACKGROUND OF THE INVENTION AND RELATED ART STATEMENT

The present invention relates to a method for controlling a movable lens of an image forming apparatus, such as a copying machine so as to stop the lens at a home position and so as to move the lens from a present position to a specified position.

Recently, many image forming apparatuses such as copying machines have been provided in which image forming magnification is changeable. In some of such apparatuses, image forming magnification is changed stepwise or continuously by moving a lens, such as a zoom lens, a fixed focal length lens and the like.

In such image forming apparatus having a movable lens, lens position is corrected to a home position (life-size position) when turning on a power switch. For example, when the power switch is turned off in an enlargement mode, the lens remains at a position of the enlargement mode. In order to reset the apparatus in a life-size mode when the power switch is turned on, it is necessary to return the lens to the home position.

As a method for correcting a lens position to a home position more precisely, Japanese Unexamined Patent Publication No. 60-513 shows one in which irrespective of a lens being in a position of the enlargement mode or reduction mode, the lens position is corrected to a home position by moving the lens in one direction at all times, whereby the irregularity in lens stop positions is reduced which is caused by backrush or the friction of gears.

However, conventional methods including the above mentioned method execute access of a lens to a home position at the same speed as the speed at which usual movement of the lens is executed and is considerably high. Accordingly, it is liable to occur that the lens passes the home position during a time that a microcomputer or the like detects the home position arrival of the lens and then stops the lens, which consequently causes a difference between the home position and the actual lens stop position.

It will be seen that the above problem can be eliminated by reducing the moving speed of the lens in correcting the lens position to the home position. However, the reduction of the moving speed of the lens disadvantageously causes vibration of the lens due to resonance and the like. If the resonance is prevented by further reducing the moving speed of the lens, a waste of time will be involved. Especially, when there is a long distance between a present position of the lens and the home position, a very long time is required to move the lens to the home position.

As methods for moving a lens from a present position to a specified position, for example, there have been a method in which a lens is moved from a present position directly to a specified position (see Japanese Unexamined Patent Publication No. 60-114,847), and another method in which a lens is firstly returned to a home position and then moved to a specified position.

However, it will been seen that a position error inevitably occurs when actually moving the lens. Accordingly, in the abovementioned former method in which a lens is directly moved to a specified position, the positional error is accumulated by repeating the movement of the lens. Consequently, it is difficult to precisely control the lens position. On the other hand, in the latter method in which a lens is once returned to a home position and then moved to a specified position, such a defect as abovementioned can be eliminated. However, if a present position of a lens is near the specified position and at the same time these two positions are far from a home position, it takes much time to move the lens to the specified position. Accordingly, rapid control of lens cannot be achieved.

SUMMARY OF THE INVENTION

An object of the present invention is to provide a method for controlling a lens of an image forming apparatus in which the lens is stopped at a home position with a reduced waste of time and an increased preciseness by moving the lens from a present position at a high speed to pass the home position and then moving it a low speed in a reverse direction to stop at the home position.

Another object of the present invention is to provide a method for controlling a lens of an image forming apparatus in which the lens is controlled with a reduced waste of time and an increase preciseness by moving the lens directly to a specified position when a present position and the specified position of the lens are on the same side of a home position, that is, when the lens does not pass the home position, and moving the lens to the home position to execute positional correction and then moving the lens to the specified position when the present position and the specified position of the lens are on the opposite sides of the home position, that is, when the lens passes the home position.

BRIEF DESCRIPTION OF THE DRAWINGS

FIGS. 5*a*, 5*b*, 5*c* are views showing movements of a zoom lens according to methods of the present invention;

DETAILED DESCRIPTION OF PREFERRED EMBODIMENTS OF THE INVENTION

Figure 1:
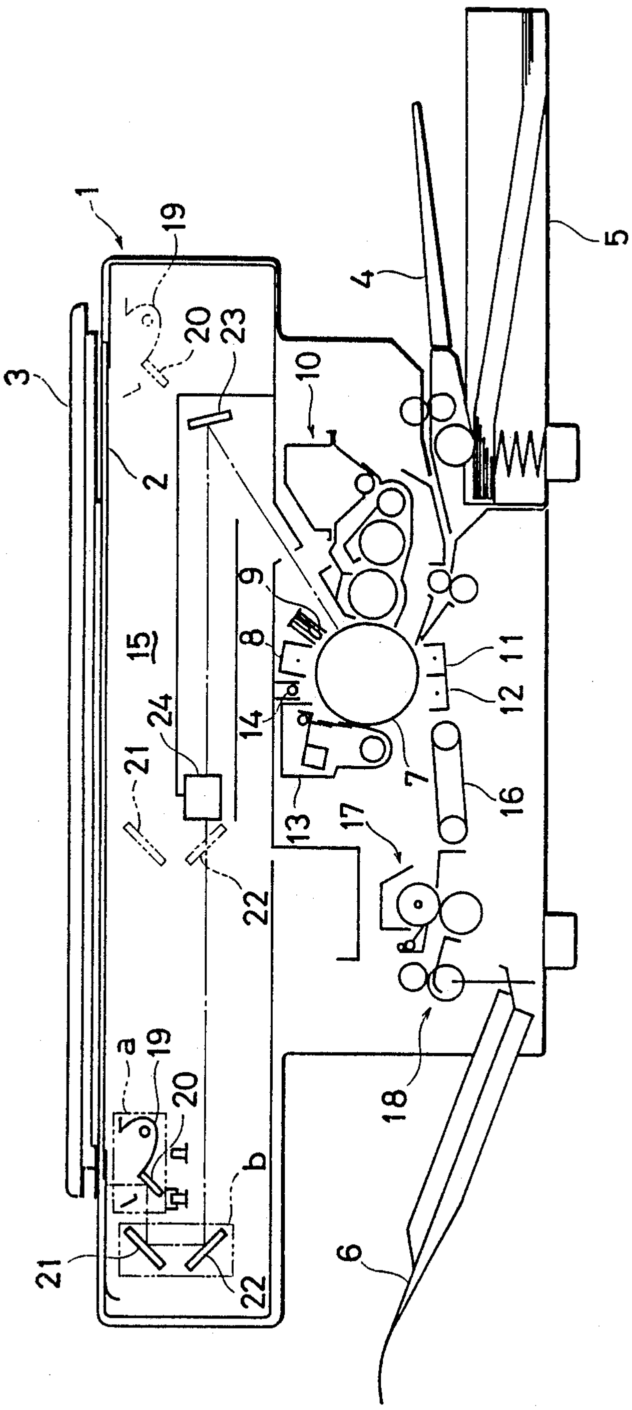
FIG. 1 is a view showing an internal construction of a copying machine in which methods of the present invention are carried out.

FIG. 1 shows an internal construction of a copying machine 1 (image forming apparatus) in which a method of the present invention is carried out. A contact glass 2 on which an original is to be put and an original cover 3 are provided in an upper portion of the copying machine 1. A paper feed tray 4 is provided in one side of the copying machine 1. A paper feed cassette 5 is mounted. A paper discharge tray 6 is provided in the other side thereof.

A photosensitive drum 7 is provided in the copying machine 1 and a main charger 8, a blank lamp 9, a developing device 10, a transfer device 11, a separating device 12, a cleaning device 13, and a discharger 14 are arranged around the photosensitive drum 7.

Above the photosensitive drum 7 is provided an optical system 15 for focusing an original image on the photosensitive drum 7. Further, a conveying belt 16, a fixing device 17 and a pair of paper discharging rollers 18 are provided on the downstream side of paper conveying direction of the photosensitive drum 7.

The optical system 15 comprises an exposure lamp 19, various kinds of mirrors 20, 21, 22, 23, and a lens or a zoom lens 24. The exposure lamp 19 and the mirrors 20, 21, 22 are integratedly fitted to movable frames a, b. A original is exposedly scanned by a predetermined reciprocating movement of the movable frames a, b. A desirable magnification is set by moving the zoom lens 24.

Figure 2:
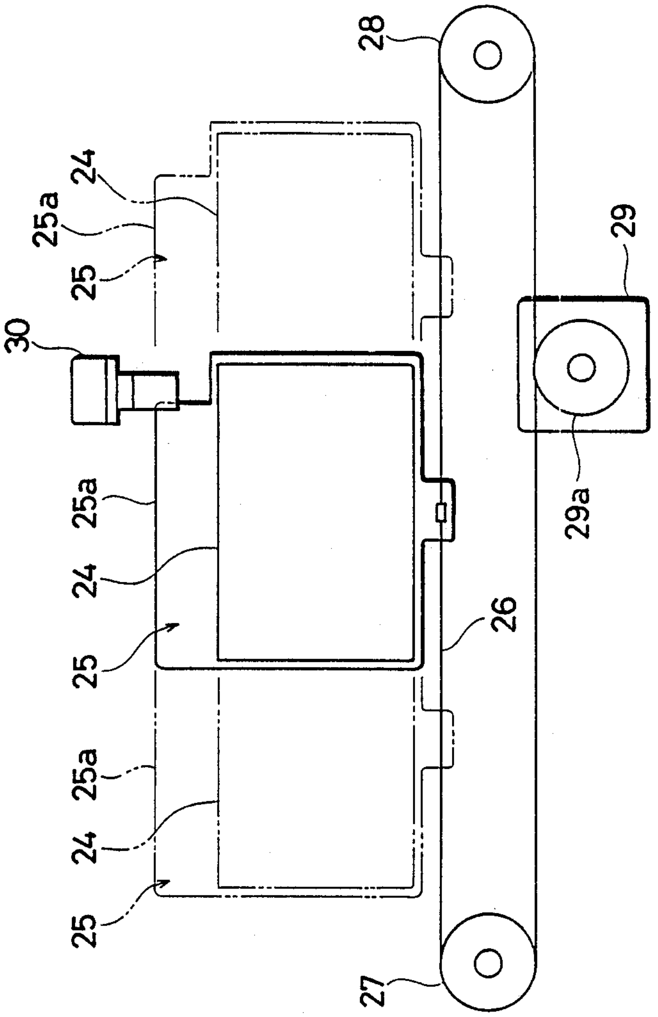
FIG. 2 is a plan view showing a mechanism for driving a zoom lens of the copying machine of FIG. 1.

A mechanism for driving the zoom lens 24 is shown in FIG. 2. The zoom lens 24 is fixed on an upper surface of a movable lens frame 25. On a forward side of the movable lens frame 25 is fixed a wire 26 which is passed over pulleys 27, 28 and wound around a driving pulley 29a of a stepping motor 29. Accordingly, the zoom lens 24 and the lens movable frame 25 are integratedly moved by driving the stepping motor 29.

Further, a photosensor 30 which includes a light-emitting element and a light-receiving element and constitutes position correcting means is provided behind the zoom lens 24. On a rear side of the movable lens frame 25 is provided a detection projection 25a which constitutes the position correcting means. The detection projection 25a is provided in such a position that the projection is apart from the photosensor 30 in an enlargement mode (100% to 141% in this embodiment), that is, when the movable lens frame 25 is on the left side of a position shown in full lines in FIG. 2, and the detection projection 25a interrupts light of the photosensor 30 in a reduction mode (62% to 99% in this embodiment), that is, when the movable lens frame 25 is on the right side of the position shown in a full line in FIG. 2. The photosensor 30 is so constructed as to be turned from OFF to ON by the interruption of light. Consequently, it is detected by ON or OFF state of the photosensor 30 whether the zoom lens 24 and the movable lens frame 25 pass the life-size position or home position.

Figure 3:
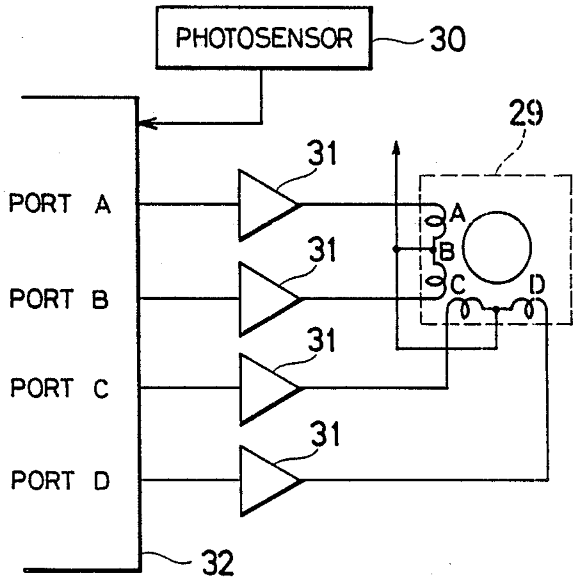
FIG. 3 is a diagrammatic view showing a circuit for driving the zoom lens of FIG. 2.

FIG. 3 shows an example of a circuit for driving the stepping motor 29. Coils A, B, C, D of the stepping motor 29 are respectively connected through buffer drivers 31 to four ports of a control device 32 (which constitutes a part of position correcting means). The coils are applied with voltage in accordance with output of the control device 32.

Figures 4A, 4B:
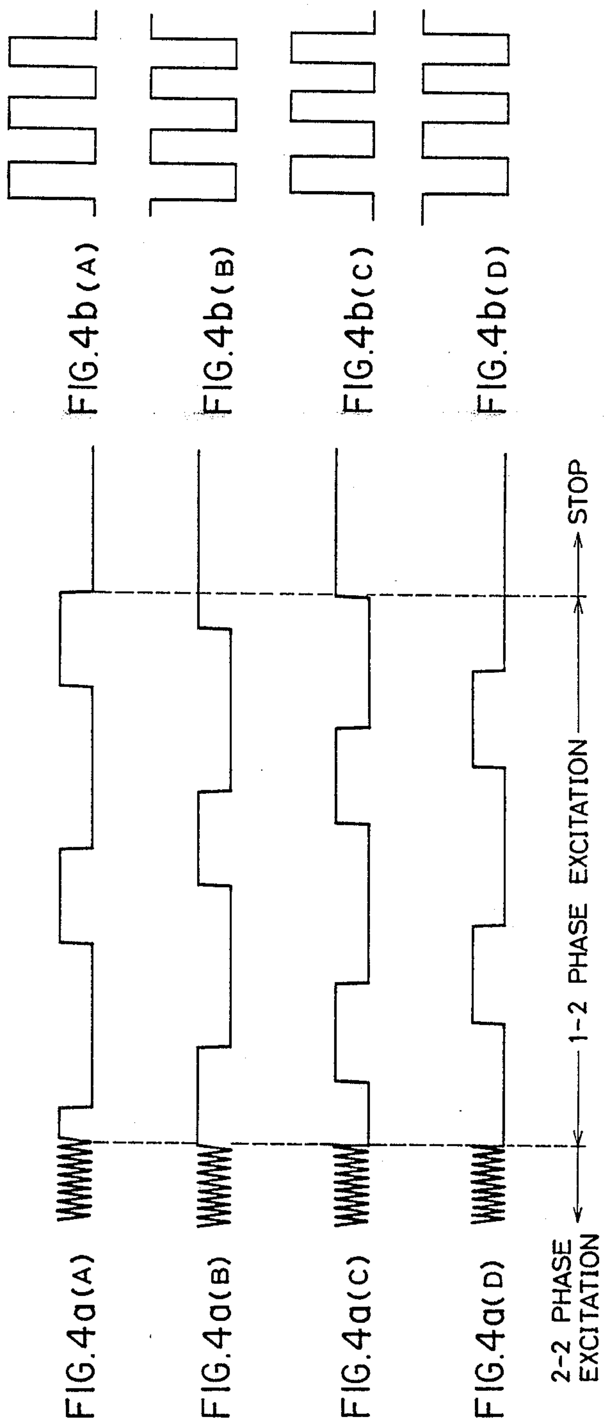
FIGS. 4*a*, 4*b* are views showing output signals of a control device in the driving circuit of FIG. 3.

The control device 32 receives a detection signal (positional signal) from the photosensor 30. An output pulse signal of the control device 32 is determined according to positional signals. According to output pulse signals of the control device 32, the stepping motor 29 is driven either at a high speed (first speed) or at a low speed (second speed). When the stepping motor 29 is driven at a high speed, such pulse signals (167 Hz here) as shown on the left side portion of FIG. 4a and FIG. 4b are issued from the control device 32 by interruption of a timer provided in the control device 32, whereby 2—2 phase excitation of the stepping motor 29 is performed. On the other hand, when the stepping motor 29 is driven at a low speed, such pulse signals (10 Hz here) as shown in the center portion of FIG. 4a are issued from the control device 32, whereby, 1-2 phase excitation of the stepping motor 29 is performed. In other words in the low speed driving of the stepping motor 29 which is performed by 1-2 phase excitation, the rotation angle of the stepping motor 29 corresponding to one pulse is half as large as in the high speed driving. Also, the pulse frequency is about 1/17 as many as in the high speed driving. Accordingly, the rotation speed of the stepping motor 29 is very low compared to the high speed driving. By providing such low speed driving vibration is eliminated that occurs when the zoom lens 24 and the movable lens frame 25 are moved. Further, such signals as shown in the right side portion of FIG. 4a are issued when stopping the zoom lens 24 so that low voltages (5 V here) are applied to the coils A, B, C, D of the stepping motor 29. Consequently, the zoom lens 24 is assuredly stopped.

When the power switch is turned on, the control device 32 executes the home position correction of the zoom lens 24 in the following manner. Movements of the zoom lens 24 are shown in FIG. 5a. In this figure, full lines, dotted lines and chain lines indicate the high speed driving, the low speed driving, and the home position respectively in this order.

(A) If the positional signal is in OFF state when the power switch is turned on (FIG. 5a, (A)):

1. The zoom lens 24 is moved in the direction of reduction by driving the stepping motor 29 at the high speed, and stopped when the stepping motor 29 completes a predetermined number of steppings (5 steps here) after the positional signal comes into ON state.
2. Next, the zoom lens 24 is moved in the reverse direction (in the direction of enlargement) by driving the stepping motor 29 at the low speed, and stopped at the moment when the positional signal comes into OFF state.

(B) If the positional signal is in ON state when the power switch is turned on (FIG. 5a, (B))

1. The zoom lens 24 is moved in the direction of enlargement by driving the stepping motor 29 at the high speed, till the positional signal comes into OFF state, that is, till the zoom lens 24 passes the home position.
2. Next, the zoom lens 24 is moved in the direction of reduction by driving the stepping motor 29 at the high speed, and stopped when the stepping motor 29 complete a stepping of five after the positional signal comes into ON state.
3. Further, the zoom lens 24 is moved in the reverse direction (in the direction of enlargement) by driving the stepping motor 29 at the low speed, and stopped at the moment when the positional signal comes into OFF state. The control of the control device 32 is shown in the flow charts of FIGS. 6, 7.

Figure 6:
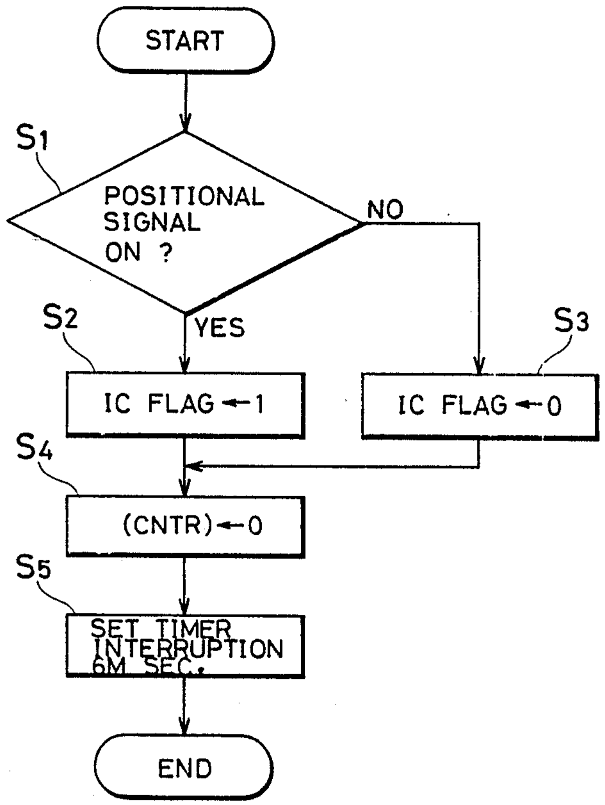
FIGS. 6 and 7 are flow charts showing control of a zoom lens in a first embodiment of the present invention.

FIG. 6 shows a routine for judging an initial position of the zoom lens 24 when the power switch is turned on.

Firstly, the positional signal is confirmed when the power switch is turned on (step $S_1$). If the positional signal is in ON state, IC flag (flag confirming the initial position of the lens) is set at 1 (step $S_2$). If the positional signal is in OFF state, IC flag is set at 0 (step $S_3$). A step counter of the stepping motor 29 is reset at 0 (step $S_4$). The interruption period of the timer provided in the control device 32 is set at 6 milliseconds so as to produce a pulse signal of 167 Hz is issued (step $S_5$).

After the initial position of the zoom lens 24 is determined in the abovementioned manner, the program advances to a drive routine.

Firstly, when the step counter of the stepping motor 29 is determined to be 0 at step $S_6$, the program advances to step $S_7$. At step $S_7$, when IC flag is 1, that is, when the zoom lens 24 is in a position of the reduction mode, the zoom lens 24 is driven at a high speed in the direction of enlargement by 2—2 phase excitation of the stepping motor 29 (step $S_9$) till the positional signal comes into OFF state (YES at step $S_8$). When the positional signal comes into OFF state, IC flag is set at 0 (step $S_{10}$). The program advances to step $S_{11}$. When IC flag is 0 at step $S_7$, the program advances directly to step $S_{11}$.

In other words, in this embodiment, if the zoom lens 24 is in a position of the reduction mode when the power switch is turned on, the zoom lens is once moved to a position of the enlargement mode and the home position correction is always started from a position of the enlargement mode.

The true home position correction is started at step $S_{11}$. Since the zoom lens 24 is always in a position of the enlargement mode at this starting point as abovementioned, the positional signal is in OFF state. Accordingly, the zoom lens 24 is driven at a high speed in the direction of reduction (step $S_{13}$).

Such high speed driving of the zoom lens 24 is continued till the position signal comes into ON state. Thereafter, the step counter of the stepping motor 29 is added with 1 by 1 (step $S_{12}$) till the step counter reaches 5 (NO at Step $S_6$). At this time, the interruption period of the timer is turned to be 100 milliseconds so that the control device 32 issues a pulse signal of 10 Hz (step $S_{14}$).

At this time, since the positional signal is in ON state (YES at step $S_{15}$), the zoom lens 24 is driven at a low speed in the direction of enlargement by 1-2 phase excitation of the stepping motor 29 (step $S_{16}$). When the positional signal comes into OFF state (NO at step $S_{15}$), the zoom lens 24 is stopped and at the same time the voltage applied to the coils A, B, C, D of the stepping motor 29 is kept at 5 V in order to hold the zoom lens 24 at a fixed position (step $S_{17}$).

The method of this embodiment executes the home position correction by moving the zoom lens 24 at a high speed from a position of the enlargement mode to a position of the reduction mode till the zoom lens 24 passes the home position, and thereafter moving it at low speed in the reverse direction and finally stopping it when the photosensor 30 comes into OFF state, as abovementioned. In other words, the zoom lens 24 is moved at a low speed immediately before being stopped. Accordingly, it will be seen that the home position correction can be attained with extremely smaller error than the conventional methods. Besides, since the zoom lens 24 is moved at a high speed to a position near the home position, loss of time can be decreased.

It will be noted that a lens driving mechanism and a position detecting means of the present invention is not limited to the abovementioned embodiment, and the abovementioned advantages can be obtained by using other known devices.

Figure 8:
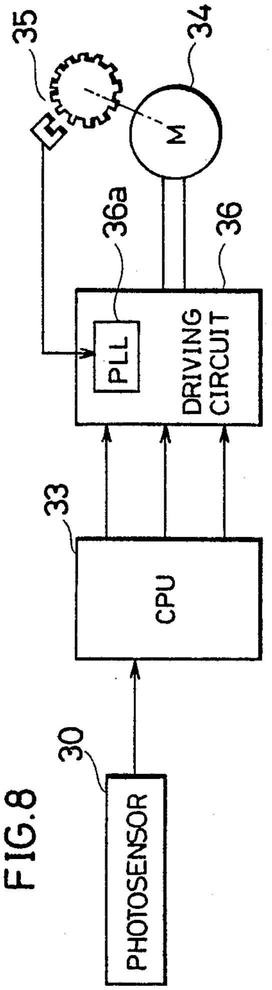
FIG. 8 is a diagrammatic view showing a circuit for driving a zoom lens in a second embodiment of the present invention.

In FIG. 8 is shown another lens driving mechanism which uses a digital servomotor.

FIG. 8 is a view showing an arrangement of a second embodiment of the present invention in which the home position correction of the zoom lens 24 is executed by using a servomotor.

In this Figure, indicated at 30 is the abovementioned photosensor for issuing a positional signal after the power switch is turned on, A positional signal is sent to a CPU 33 for use in control. The CPU 33 receives a positional signal, and issues a signal for driving and stopping the zoom lens 24 and also issues a signal for controlling the rotation direction of the servomotor 34, namely, the driving direction of the zoom lens 24 and a driving reference clock pulse so that the drive of the zoom lens 24 is controlled. A rotary disk having a plurality of rectangular teeth at a predetermined interval on its periphery is connected to a rotary shaft of the servomotor 34. Also, a photosensor is provided near the rotary disk. The rotary disc and the photosensor constitute a rotary encoder 35. The rotary encoder 35 issues a rotary pulse having a cycle in proportion to the rotation speed of the servomotor 34. The rotary pulse is sent to a PLL 36*a* which compares the phase of the rotary pulse with that of the clock pulse so that the servomotor can rotate accurately in synchronism with the driving reference clock. The driving circuit 36 receives the abovementioned signals from the CPU 33 and the PLL 36*a* to drive the servomotor 34.

Figure 9:
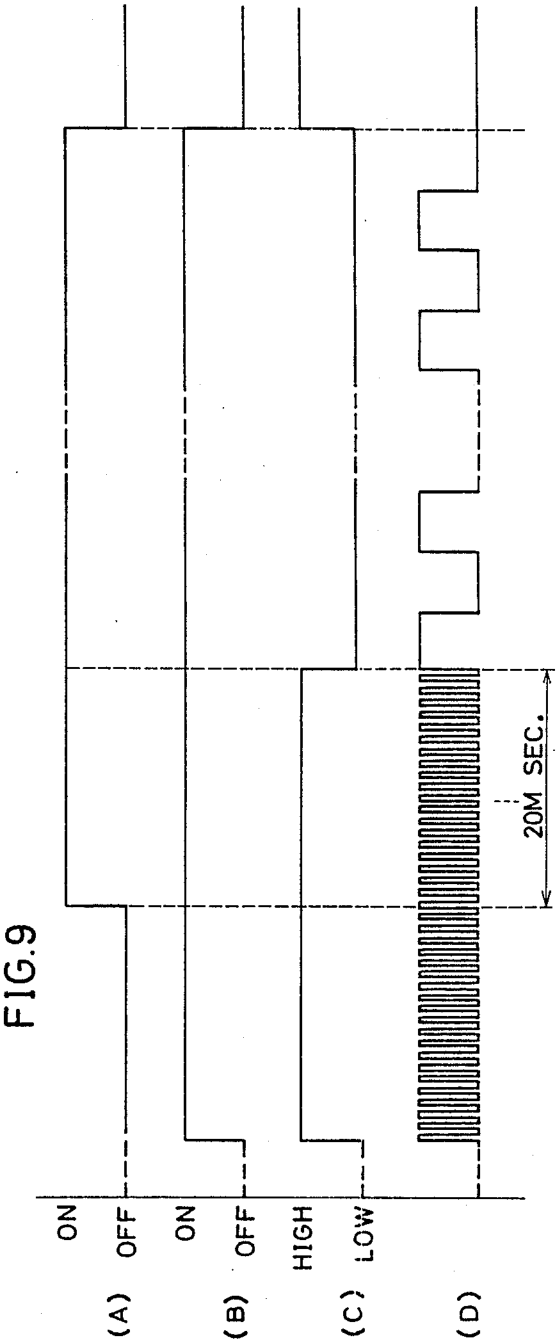
FIG. 9 is a view showing output signals of the driving circuit of FIG. 8.

FIG. 9 is a wave form view explaining driving of the servomotor 34. A signal (A) is a positional signal whose OFF state indicates a position of enlargement mode and ON state indicates a position of reduction mode. A signal (B) is a driving signal and gives a driving command to the servomotor 34 during ON state. A signal (C) is a signal for determining the moving direction of the zoom lens 24. At high level of the signal (C), the zoom lens 24 is moved from enlargement to reduction, and at low level the zoom lens 24 from reduction to enlargement. A signal (D) indicates a clock pulse for driving the servomotor 34. The left side half indicates a pulse of 1000 Hz for driving the servomotor 34 at a high speed and the right side half a pulse of 100 Hz for driving the servomotor 34 at a low speed.

Figure 10:
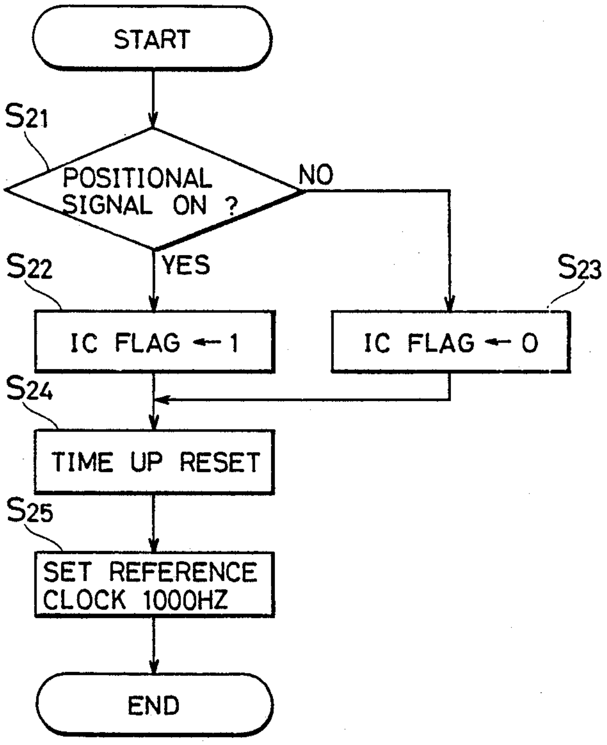
FIGS. 10 and 11 are flow charts showing control of the zoom lens by the driving circuit of FIG. 8.
Figure 11:
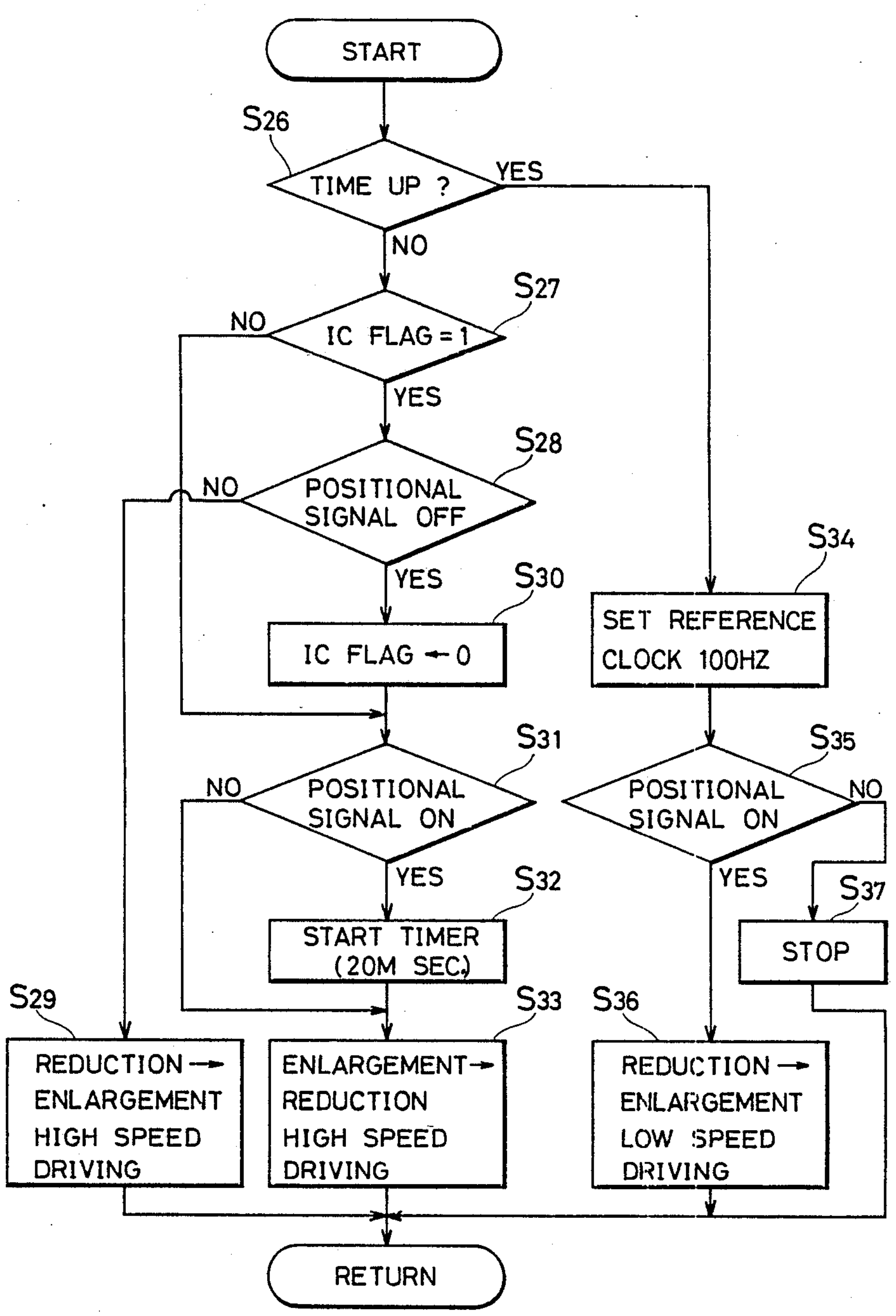

The control of the zoom lens 24 by the use of the servomotor 34 is shown in flow charts of FIGS. 10 and 11.

FIG. 10 corresponds to FIG. 6 of the first embodiment.

If the positional signal is in ON state when the power switch is turned on, IC flag is set at 1. If it is in OFF state, IC flag is set at 0 (steps $S_{21}$ to $S_{23}$). A time up value (equivalent to 20 milliseconds, see the signal (D) in FIG. 9) is reset in a timer provided in the CPU 33 (step $S_{24}$). A driving reference pulse of 1000 Hz (the left side half of the signal (D) in FIG. 9) is issued (step $S_{25}$).

After the intial position of the zoom lens 24 is determined in the abovementioned manner, the program advances to a true driving routine shown in FIG. 11. The movement of the zoom lens 24 is shown in FIG. 5*a*.

Figure 7:
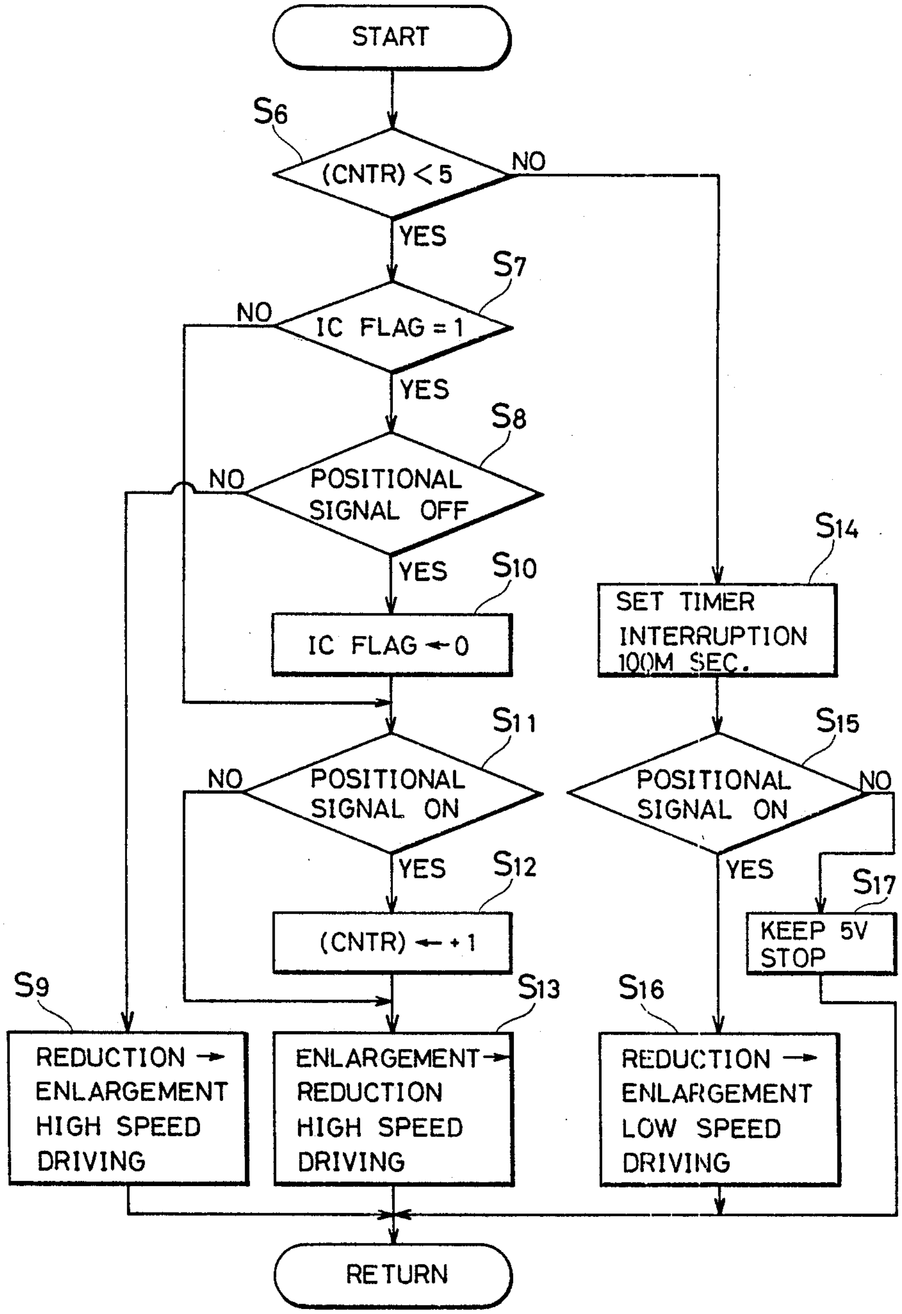

FIG. 11 corresponds to FIG. 7 in the first embodiment. Firstly, at step $S_{26}$, the timer has yet not started. Consequently, the determination of step $S_{26}$ is NO and the program advances to step $S_{27}$. When IC flag is 1 at step $S_{27}$, the zoom lens 24 is in a position of the reduction mode. Also, the determination of step $S_{28}$ is NO. Accordingly, the zoom lens 24 is moved at a high speed till the positional signal comes into OFF state (steps $S_{27}$ to $S_{29}$). When the positional signal comes into OFF state, IC flag is set at 0 (step $S_{30}$). The program advances to step $S_{31}$. If when flag is 0 at step $S_{27}$, the program advances directly to step $S_{31}$.

Since the zoom lens 24 is in a position of the enlargement mode at this stage, the positional signal is in OFF state. Consequently, the determination of step $S_{31}$ is NO and the zoom lens 24 is moved at a high speed in the direction of reduction (step $S_{33}$). Such high speed driving of the zoom lens 24 is continued till the positional signal comes into ON state (YES at step $S_{31}$). At this time, the timer is started (step $S_{32}$). When 20 milliseconds have passed (YES at step $S_{26}$), a driving reference clock pulse of 100 Hz is issued (step $S_{34}$).

Since the positional signal is ON state at this time (YES at step $S_{35}$), the zoom lens 24 is driven at a low speed in the direction of enlargement (step $S_{36}$). When the positional signal comes into OFF state (NO at step $S_{35}$), the zoom lens 24 is stopped (step $S_{37}$).

Since the zoom lens 24 is always moved to the home position in the same direction, the irregularity in lens stop position can be eliminated and the home position correction can be carried out with an increased preciseness.

In the abovementioned two embodiments, the home position correction is executed in the same direction. However, the home position correction can be precisely-executed by moving the zoom lens 24 to the home position in different directions with using two kinds of driving speed, namely, a high speed and a low speed. This movement of the zoom lens 24 is shown in FIG. 5*b*.

Figure 12:
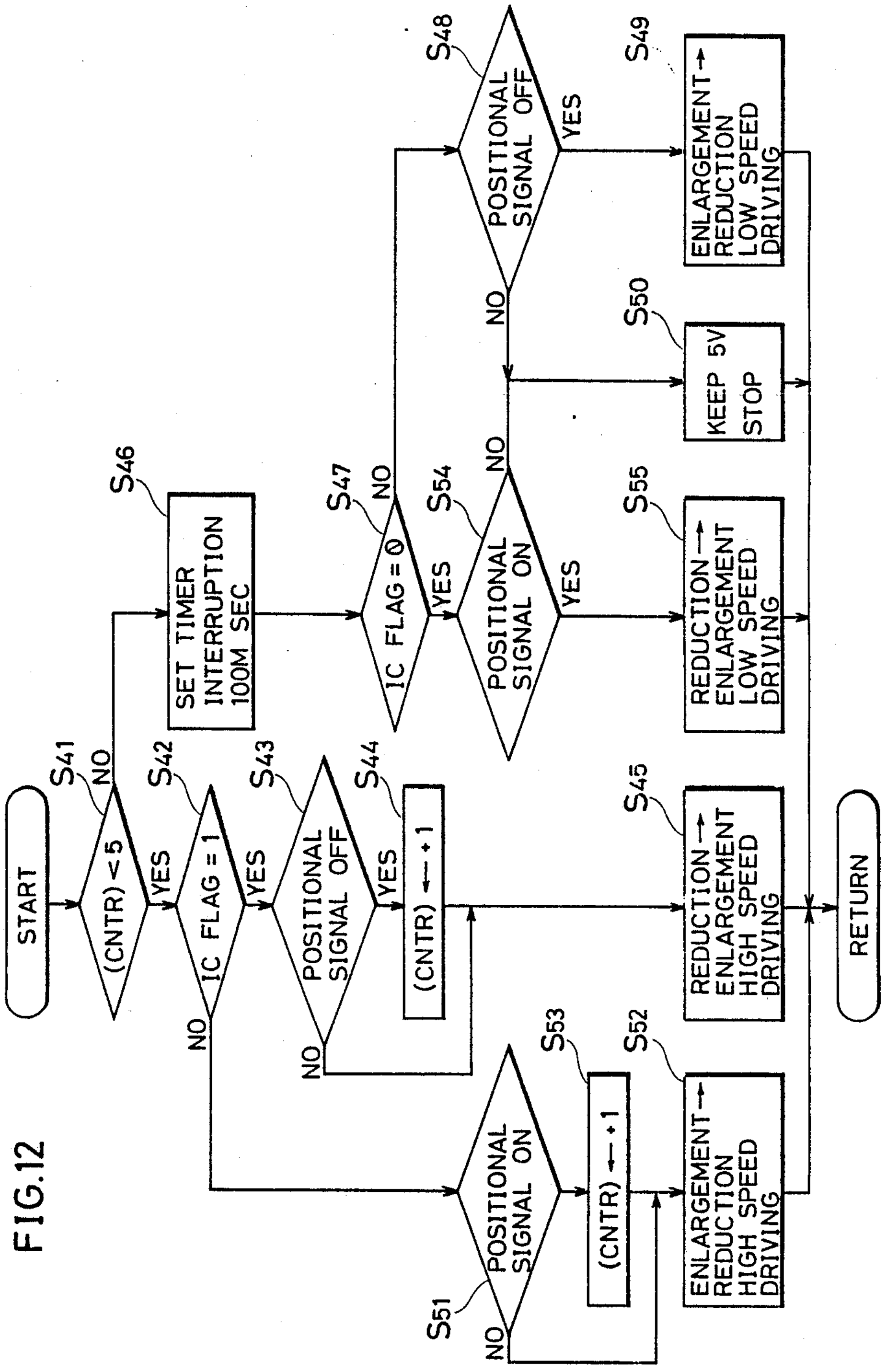
FIG. 12 is a flow chart showing control of a zoom lens according to a third embodiment of the present invention.

FIG. 12 is a control flow chart showing a third embodiment of the present invention in which a stepping motor is used as shown in FIG. 7. However, this embodiment can be sufficiently carried out by using a servomotor.

In FIG. 12, since the step counter of the stepping motor 29 is 0 at step $S_{41}$, the program advances to step $S_{42}$. When IC flag is 1 at step $S_{42}$, that is, when the zoom lens 24 is in a position of the reduction mode, the positional signal is in ON state (NO at step $S_{43}$). Accordingly, the zoom lens 24 is driven at a high speed in the direction of enlargement (step $S_{45}$). Such high speed driving of the zoom lens 24 is continued till the positional signal comes into OFF state (YES at step $S_{43}$). At this time, the step counter of the stepping motor 29 is added with 1 by 1 (step $S_{44}$) till the step counter reaches 5 (NO at step $S_{41}$). At this time, the interruption period of the timer is changed to 100 milliseconds (step $S_{46}$) so that the driving reference clock pulse of 10 Hz is issued from the control device 32. Since IC flag is 1 at this time (NO at step $S_{47}$) and at the same time the positional signal is in OFF state (YES at step $S_{48}$), the zoom lens 24 is driven at low speed in the direction of reduction (step $S_{49}$). When the positional signal comes into ON state (NO in step $S_{48}$), the zoom lens 24 is stopped and kept at the position (step $S_{50}$) (FIG. 5*b* (B)).

On the other hand, when IC flag is 0 at step $S_{42}$, that is, when the zoom lens 24 is in a position of the enlargement mode (NO at step $S_{42}$), the zoom lens 24 is driven at a high speed in the direction of reduction (step $S_{52}$). Such high speed driving of the zoom lens 24 is continued till the positional signal comes into ON state (YES at step $S_{51}$). At this time, the step counter is added with 1 by 1 (step $S_{53}$) till the step counter reaches 5. At this time, the driving reference clock pulse of 10 Hz is issued to start the low speed driving of the zoom lens 24 (NO at step $S_{41}$, step $S_{46}$).

At this time, since IC flag 0 and the positional signal is ON (YES both at $S_{47}$ and $S_{54}$), the zoom lens 24 is driven at a low speed in the direction of enlargement (step $S_{55}$). When the positional signal comes into OFF state (NO at step $S_{54}$), the zoom lens 24 is stopped (step $S_{50}$) (FIG. 5*b* (A)).

In the abovementioned third embodiment in which only one photosensor 30 is used, the home position correction of the zoom lens 24 is executed with less increased preciseness than in the case in which the zoom lens 24 is always moved to the home position in one direction. In other words, even if a command that the zoom lens 24 be stopped is given at the home position, a stopped position of one direction is liable to be a little different from a stopped position of the other direction. This is because the zoom lens 24 is moved to the home position in the opposite directions.

Figure 13:
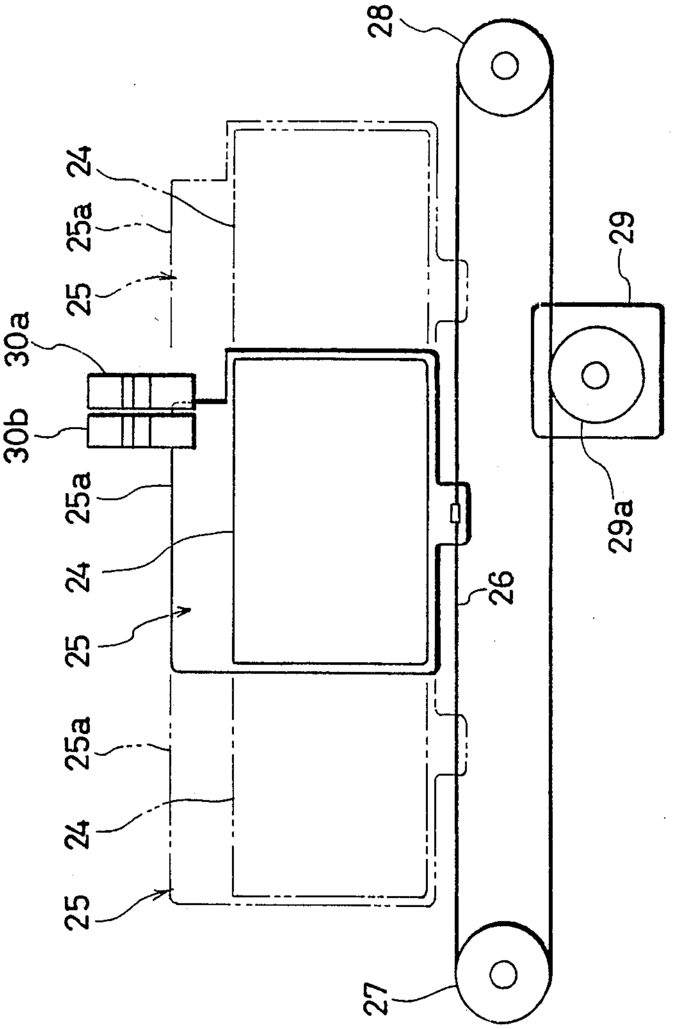
FIG. 13 is a plan view showing a mechanism for driving a zoom lens in a fourth embodiment of the present invention.

FIG. 13 shows a mechanism for driving a zoom lens which is used in a more preferred embodiment to eliminate the slight stopped position difference caused in the abovementioned third embodiment. The arrangement of this embodiment is the same with that shown in FIG. 2 with an exception that two photosensors 30*a*, 30*b* are provided as shown in FIG. 13.

In FIG. 13, the photosensors 30*a*, 30*b* are arranged near each other so as to detect the detection projection 25*a*. The positions of the photosensors 30*a*, 30*b* are determined so that both a position at which the zoom lens 24 is stopped when the zoom lens 24 is moved at a predetermined low speed from a position of the reduction mode to a position of the enlargement mode and then the photosensor 30*a* detects an end of the detection projection 25*a* (the output changes from ON state to OFF state) and a position at which the zoom lens 24 is stopped when the zoom lens 24 is moved at a predetermined low speed from a position of the enlargement mode to a position of the reduction mode and then the photosensor 30*b* detects an end of the detection projection 25*b* (the output changes from OFF state to ON state) coincide with the home position.

The flow chart of FIG. 12 is basically applicable to this embodiment. However, it will be noted that there are the following differences: It is detected by the two photosensors 30*a*, 30*b* whether the positional signals are in OFF or ON state at step $S_{43}$ and $S_{51}$; After the interruption of timer (step $S_{46}$), ON state determination of the positional signal at step $S_{54}$ is executed by only the photosensor 30*a* and at the same time OFF state determination of the positional signal at step $S_{48}$ is executed by only the photosensor 30*b*.

In other words, in FIG. 12, when IC flag is 1 at step $S_{42}$, that is, when the zoom lens 24 is in a position of the reduction mode, both positional signals of the photosensors 30*a*, 30*b* are in ON state (NO at step $S_{43}$). Accordingly, the zoom lens 24 is moved at a high speed to a position of the enlargement mode (step $S_{45}$). Such a high speed driving of the zoom lens 24 is continued till both positional signals of the photosensors 30*a*, 30*b* come into OFF state (YES at step $S_{43}$). At this time, the step counter of the stepping motor 29 is added with 1 by 1 (step $S_{44}$). When the step counter reaches 5 (NO at step $S_{41}$), the interruption period of the timer is changed to 100 milliseconds (step $S_{46}$) so that the driving reference clock pulse of 10 Hz is issued from the control device 32. At this time, since IC flag is 1 (NO at step $S_{47}$) and at the same time the positional signal of the photosensor 30*b* is in OFF state (YES at step $S_{48}$), the zoom lens 24 is moved at a low speed in the direction of reduction (step $S_{49}$). When the positional signal of the photosensor 30*b* comes into ON state (NO at step $S_{48}$) the zoom lens 24 is stopped and held at the position (step $S_{50}$) (FIG. 5*b* (B)). Consequently, the zoom lens 24 is stopped at the home position.

On the other hand, when the zoom lens 24 is in a position of the enlargement mode (NO at step $S_{42}$), the zoom lens 24 is moved at a high speed in the direction of reduction (step $S_{52}$) till both positional signals of the photosensors 30*a*, 30*b* come into ON state (YES at step $S_{51}$). Such a high speed driving of the zoom lens 24 is continued till both positional signals of the photosensors 30*a*, 30*b* come into ON state, At this time, the step counter is added with 1 by 1 (step $S_{53}$). When the step counter reaches 5, the driving reference clock pulse of 10 Hz is issued so as to start the low speed driving of the zoom lens 24 (NO at step $S_{41}$, step $S_{46}$).

Since IC flag is 0 at this time and the positional signal of the photosensor 30*a* is in ON state (YES both at steps $S_{47}$ and $S_{54}$), the zoom lens 24 is moved at a low speed to a position of enlargement (at step $S_{55}$). When the positional signal of the photosensor 30*a* comes into OFF state (NO at step $S_{54}$), the zoom lens 24 is stopped and held at the position (step $S_{50}$) (FIG. 5*b* (A)). The zoom lens 24 is stopped at the same home position as the reverse direction movement.

According to the abovementioned first to fourth embodiments, the zoom lens 24 is moved at a high speed from the present position till passing the home position, and thereafter moved at a low speed in the reverse direction to stop at the home position. Accordingly, the zoom lens 24 can be stopped at the home position with decreased waste of time by the high speed movement to a position near the home position. Also, the zoom lens 24 can be stopped at the home position with increased preciseness by the low speed movement immediately before stopping.

The home position correction of the zoom lens 24 is executed by the control device 32 and the photosensor 30 in the abovementioned manner. Further, a fifth embodiment of the present invention will be described in which movement of the zoom lens 24 from a present position to a specified position (a position in accordance with a magnification given by an operator) is controlled by the stepping motor 29 or the servomotor 34.

This control of the lens movement is carried out according to the following scheme. In the following embodiments, a home position is refered to as a life-size position.

(A) When the present position of the zoom lens 24 and a specified position are on the same side of the life-size position:

A distance between the present position of the zoom lens 24 and the specified position is computed and the zoom lens 24 is moved so as to cover the distance.

(B) When the present position of the zoom lens 24 and the specified position are on the opposite sides of the life-size position:

Firstly, the zoom lens 24 is moved to the life-size position at which position correction is then executed. Thereafter, a distance is computed which is between the life-size position and the specified position and the zoom lens 24 is moved the distance to reach the specified position.

Such control operation will now be described with reference to the flow chart of FIG. 14.

Figure 14:
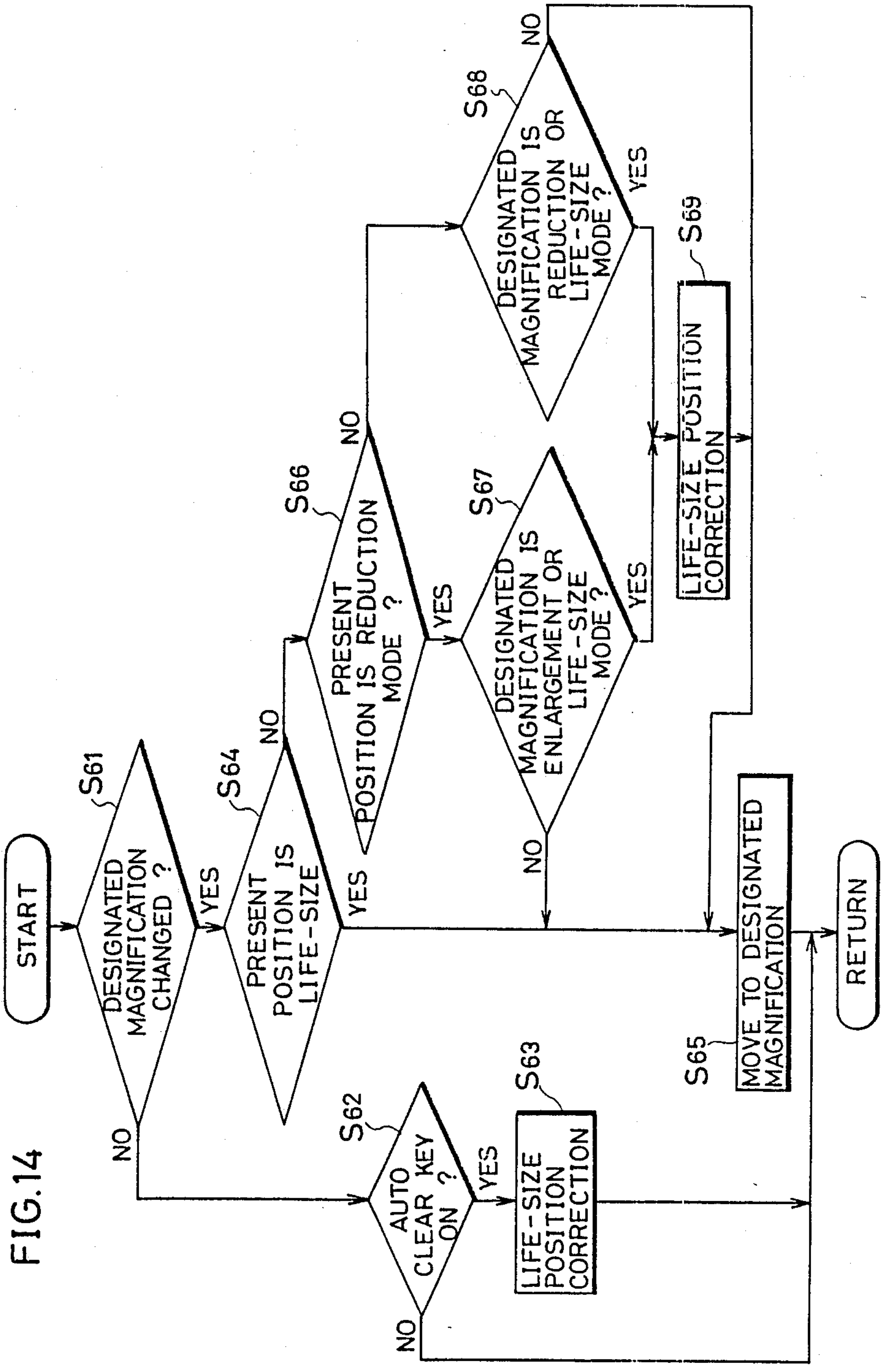
FIG. 14 is a flow chart showing control of a zoom lens in a fifth embodiment of the present invention.

In FIG. 14, firstly, it is checked whether the magnification designated by operating keys or the like has changed from a previous designated magnification (step $S_{61}$). When the designated magnification has not changed, it is not necessary to move the zoom lens 24. However, when an auto clear key is turned on (YES at step $S_{62}$), the copying machine comes into a life-size mode and the life-size position correction of the zoom lens 24 is executed (step $S_{63}$).

On the other hand, when the designated magnification has changed (YES at step $S_{61}$), the present position of the zoom lens 24 is detected. The following control is executed based on the present position.

Figure 17A:
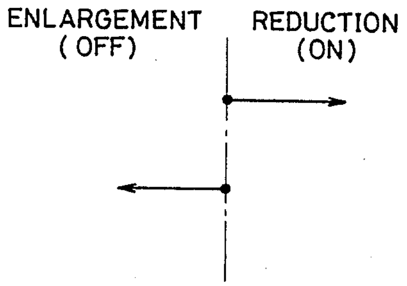
FIGS. 17a, 17b, 17c are views showing movements of a zoom lens according to methods of the present invention.
Figure 17:
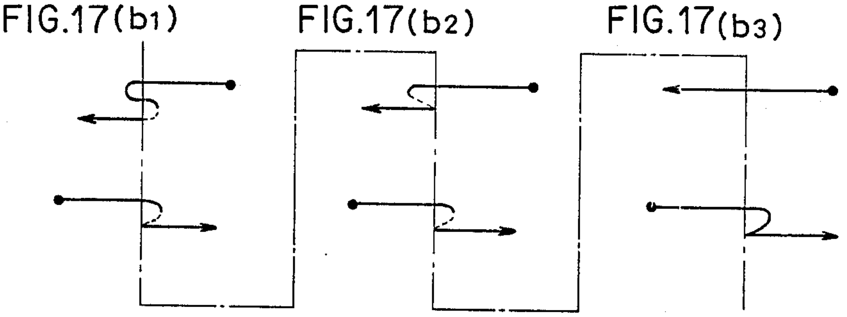

(a) When the present position is the life-size position (YES at step $S_{64}$) the zoom lens 24 is directly moved by a predetermined number of pulses from the present life-size position to the specified position in accordance with a designated magnification (step $S_{65}$). This movement of the zoom lens 24 is shown in FIG. 17*a*.

(b) When the present position is in the reduction mode and the designated magnification is in the enlargement mode or the life-size mode (YES at both of step $S_{66}$ and step $S_{67}$), or when the present position is in the enlargement mode and the designated magnification is in the reduction mode or the life-size mode (NO at step $S_{66}$ and YES at step $S_{68}$), the life-size position correction of the zoom lens 24 is executed in accordance with flow chart of FIG. 7, 11 or 12 and this latter execution is indicated at step $S_{69}$ in FIG. 14. Thereafter, the zoom lens 24 is moved from the life-size position to the specified position (step $S_{65}$). This movement of the zoom lens 24 is shown in FIG. 17*b*. In other words, FIG. 17*b* ($b_1$) shows the life size position correction of the zoom lens 24 executed by moving the zoom lens 24 in the same direction at a high speed and a low speed (FIGS. 7 and 11).

FIG. 17*b* ($b_2$) shows the life-size position correction of the zoom lens 24 executed by moving the zoom lens 24 in two directions at a high speed and a low speed (FIG. 12). When the specified position is the life-size position, the zoom lens has reached the specified position by executing the life-size position correction.

Figure 17C:
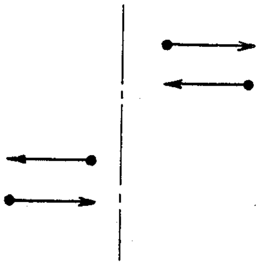

(c) When the present position is in the reduction mode and the designated magnification is in the reduction mode (YES at step $S_{66}$ and NO at step $S_{67}$), or when the present position is in the enlargement mode and the magnification is in the enlargement mode (NO at step $S_{66}$ and NO at step $S_{68}$), the life-size position correction is not executed but the zoom lens 24 is directly moved to the specified position. This movement of the zoom lens 24 is shown in FIG. 17*c*.

According to this method, when the zoom lens 24 is moved from a position of the enlargement mode to a position of the reduction mode or from a position of the reduction mode to a position of the enlargement mode, the life-size position correction of the zoom lens 24 is once executed in the way and then the zoom lens 24 is moved to a specified position. Accordingly, an error in position of the zoom lens 24 caused in the preceding movement can be eliminated by this position correction and position of the zoom lens 24 can be precisely controlled at all times.

Further, when the zoom lens 24 does not pass the life-size position, in other words, when the zoom lens 24 is moved from a position of the enlargement mode to another position of the enlargement mode or from a position of the reduction mode to another position of the reduction mode, the life-size position correction of the zoom lens 24 is not executed but the zoom lens 24 is moved directly to a specified position in the same manner as used in conventional copying machines.

Accordingly, little waste of time is consumed. Furthermore, when the life-size position correction of the zoom lens 24 is once executed and then the zoom lens 24 is moved to a specified position, the distance between the life-size position and the specified position is computed and the zoom lens 24 is moved so as to cover the distance by sending a driving motor pulses corresponding to the distance as conventional copying machines. Accordingly, the movement of the zoom lens 24 can be controlled more rapidly than a conventional method in which the zoom lens 24 is moved stepwise to a specified position with confirming the position of the zoom lens 24.

In the abovementioned fifth embodiment of the present invention, the life-size position correction of the zoom lens 24 is executed at a high speed and a low speed and thereafter the zoom lens 24 is moved to a specified position. However, according to the present invention, the zoom lens 24 can be moved to a specified position after the life-size position correction is executed by moving the zoom lens 24 at one kind of speed in the same direction, as mentioned in the following sixth embodiment. This movement of the zoom lens 24 is shown in FIG. 5*c* and FIG. 17*b* ($b_3$).

Figure 15:
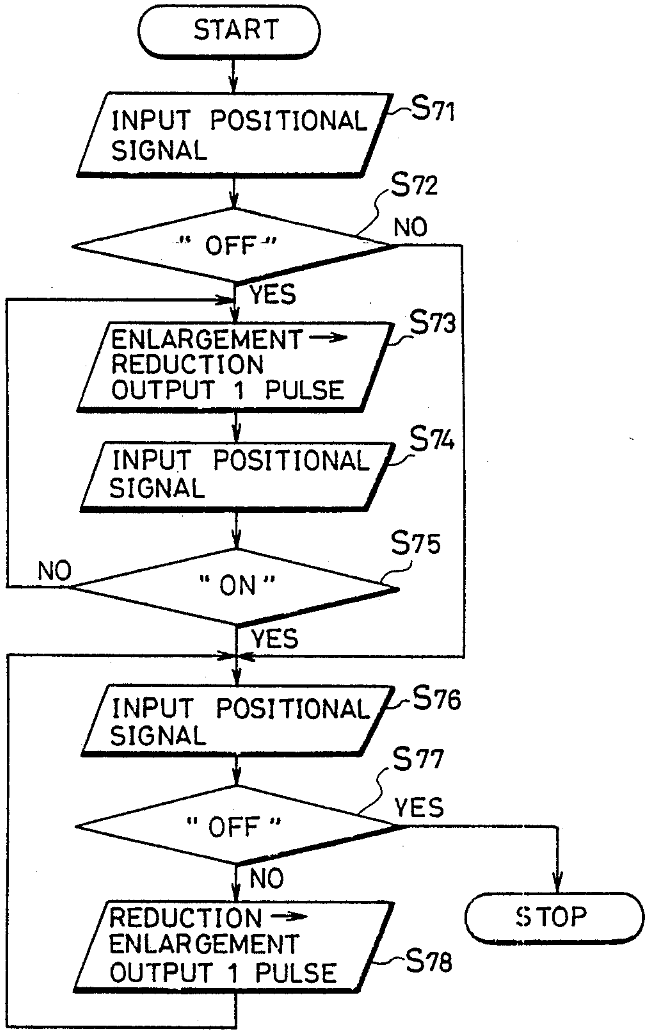
FIGS. 15 and 16 are flow charts showing control of a zoom lens in a sixth and seventh embodiments of the present invention.

FIG. 15 is a flow chart showing control of a zoom lens 24 in the sixth embodiment in which the life-size position correction of the zoom lens 24 is executed by using a stepping motor.

In FIG. 15, firstly a positional signal from a photosensor 30 is sent to a control device 32 (step $S_{71}$). When the positional signal is in OFF state, that is, when the zoom lens 24 is in a position of the enlargement mode (YES at step $S_{72}$), the stepping motor 29 is driven one pulse by one pulse by pulse signals from the control device 32 to move the zoom lens 24 in the direction of reduction (step $S_{73}$). During this movement, input and confirmation of the positional signal are performed at each pulse (steps $S_{74}$, $S_{75}$). When the positional signal comes into ON state (YES at step $S_{75}$), the program advances to step $S_{76}$. The zoom lens 24 is moved in the direction of enlargement by driving the stepping motor 29 till the positional signal sent at step $S_{76}$ comes into OFF state (step $S_{78}$). When the positional signal comes into OFF state (YES at step $S_{77}$), the zoom lens 24 is stopped. Consequently, the position correction of the zoom lens 24 is completed.

On the other hand, when the positional signal is in ON state at step $S_{72}$, that is, when the zoom lens 24 is in a position of the reduction mode (NO at step $S_{72}$), the program advances directly to step 76.

The zoom lens 24 is then moved in the direction of enlargement by driving the stepping motor 29 till the positional signal sent at step $S_{76}$ comes into OFF state (step $S_{78}$). When the positional signal comes into OFF state (YES at step $S_{77}$), the zoom lens 24 is stopped. Consequently, the position correction of the zoom lens 24 is completed.

In other words, according to this method, the zoom lens 24 is always moved at a constant speed. The life-size position correction of the zoom lens 24 is always executed by moving the zoom lens 24 in one direction irrespective of the state in which the present position of the zoom lens 24 is in the enlargement mode or in the reduction mode.

Figure 16:
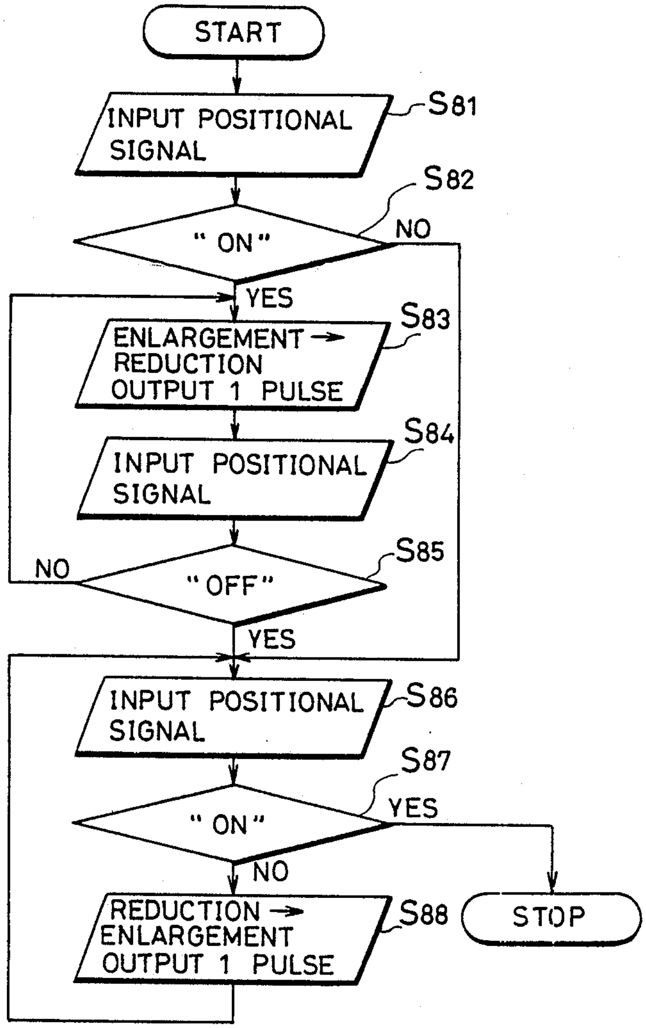

FIG. 16 is a control flow chart showing a seventh embodiment of the present invention. This control method is substantially the same as that of FIG. 15. Only one difference is that the output of the photosensor 30 of FIG. 15 is in OFF state in the enlargement mode and in ON state in the reduction mode while the output of the photosensor 30 of FIG. 16 is in ON state in the enlargement mode and in OFF state in the reduction mode.

The control of the flow chart of FIG. 16 will be described.

In FIG. 16, firstly, a positional signal from the photosensor 30 is sent to the control device 32 (step $S_{81}$). When the positional signal is in ON state, that is, when the zoom lens 24 is in a position of the enlargement mode (YES at step $S_{82}$), the zoom lens 24 is moved in the direction of reduction by driving a stepping motor 29 one pulse by one pulse by pulse signals from the control device 32 (step $S_{83}$). In this movement, the input and confirmation of the positional signal are performed at each pulse (step $S_{84}$, $S_{85}$). When the positional signal comes into OFF state (YES at step $S_{85}$), the program advances to step $S_{86}$. The zoom lens 24 is moved in the direction of enlargement by driving the stepping motor 29 till the position signal sent at step $S_{86}$ comes into ON state (step $S_{88}$). When the positional signal comes into ON state (YES at step $S_{87}$), the zoom lens 24 is stopped. Consequently, the position correction of the zoom lens 24 is completed (FIG. 5*c*, (B)).

On the other hand, the positional signal is in OFF state at step $S_{82}$, that is, when the zoom lens 24 is in a position of the reduction mode (NO at step $S_{82}$), the program advances directly to step $S_{86}$. The zoom lens 24 is moved in the direction of enlargement till the position signal sent at step $S_{86}$ comes into ON state (step $S_{88}$). When the positional signal comes into ON state (YES at step $S_{87}$), the zoom lens 24 is stopped. Consequently, the position correction of the zoom lens 24 is completed (FIG. 5*c*, (A)).

In other words, according to this method, the lens 24 is always moved at a constant speed in the same way as that of FIG. 15. The life-size position correction of the zoom lens 24 is always executed by moving the zoom lens 24 in one direction irrespective of the state in which the present position of the zoom lens 24 is in the enlargement mode or in the reduction mode.

In the abovementioned embodiments, the position correction of a zoom lens is described with a home position being set at a life-size position. However, according to the present invention, it will be apparent that same control is applicable in the case that position correction of a zoom lens is executed with a home position being set a position of the enlargement mode or a position of the reduction mode.

Also, it will be apparent that a method of the present invention is not limitedly applied for a zoom lens but is applicable for other kinds of lens used in image forming apparatus, such as fixed focal length lens to assure the same effects.

Furthermore, in the abovementioned embodiments of the present invention in which the position correction of a zoom lens is executed in one direction, the zoom lens 24 is once moved to a position of the enlargement mode and then moved in the direction of reduction. However, it will be apparent that position correction of a zoom lens may be executed by firstly moving the zoom lens to a position of the reduction mode and then moving it in the direction of enlargement.

What is claimed is:

1. A method for controlling a lens of an image forming apparatus comprising the steps of moving said lens at a first speed in one direction from an initial position until passing a home position, and moving said lens at a second speed lower than said first speed in a direction opposite to said one direction to stop at said home position.

2. A method for controlling a lens of an image forming apparatus comprising the steps of moving said lens at a first speed from an initial position toward a home position to pass said home position, and moving said lens at a second speed lower than said first speed to stop said lens at said home position.

3. A method according to claim 2, wherein the movement of said lens at said second speed is always executed in the same direction.

4. A method according to claim 2, wherein the movement of said lens at said second speed is executed in one of two directions depending on which side of said home position said lens was initially located.

5. A method according to claim 2, wherein said step of moving said lens at said second speed to stop at said home position comprises moving said lens in the same direction irrespective of which side of the home position the lens was initially located.

6. A method according to claim 2, wherein said step of moving said lens at said second speed is executed in a direction opposite to the direction at which said step of moving said lens at said first speed was executed.

7. A method according to claim 2, wherein said lens is moved according to a first operational sequence when said lens is initially located on one side of said home position and said lens is moved according to a second operational sequence when said lens is initially located on the other side of said home position, said first operational sequence comprising (i) moving said lens at said first speed in one direction past said home position, and (ii) moving said lens at said second speed in a direction opposite to said one direction to said home position to stop at said home position; said second operational sequence comprising (iii) moving said lens at said first speed in said opposite direction past said home position (iv) moving said lens at said first speed in said one direction until the lens again passes said home position, and (v) moving said lens at said second speed in said opposite direction to said home position to stop at said home position, whereby said lens is moved in said opposite direction to said home position to stop at said home position regardless of which side of the home position the lens was initially located.

8. A method according to claim 2, wherein said lens is moved according to a first operational sequence when said lens is initially located on one side of said home position and said lens is moved according to a second operational sequence when said lens is initially located on the other side of said home position, said first operational sequence comprising (i) moving said lens at said first speed in one direction past said home position, and (ii) moving said lens at said second speed in a direction opposite to said one direction to said home position to stop at said home position; said second operational sequence comprising (iii) moving said lens at said first speed in said opposite direction past said home position; and (iv) moving said lens at said second speed in said one direction to said home position to stop at said home position.

9. A method according to claim 2, further comprising the step of utilizing a sensor for detecting said home position of said lens.

10. A method according to claim 2, further comprising the steps of utilizing a first sensor for detecting said home position when said lens is moved at said second speed in one direction to stop at said home position, and utilizing a second sensor for detecting said home position when said lens moves at said second speed in a direction opposite to said one direction to stop said lens at said home position.

11. A method according to claim 2, further comprising the step of utilizing a stepping motor for moving said lens.

12. A method according to claim 11, further comprising the step of controlling said stepping motor utilizing a timer.

13. A method according to claim 11, further comprising the step of controlling said stepping motor utilizing a timer and a phase changer.

14. A method according to claim 2, further comprising the step of utilizing a servo motor for moving said lens.

15. A method for controlling a lens of an image forming apparatus comprising the steps of moving said lens at a first speed in either one of two directions to pass a home position with the direction of movement depending on which side of the home position the lens was initially located prior to such movement, and moving said lens at a second speed to said home position to stop at said home position, said second speed being less than said first speed.

16. A method for controlling a lens of an image forming apparatus comprising the steps of moving said lens in one direction to a home position to stop said lens at said home position when said lens is initially located on one side of said home position, and effecting the following operational sequence when said lens is initially located on the other side of said home position: (i) moving said lens in a direction opposite to said one direction past said home position, and (ii) moving said lens in said one direction to said home position to stop at said home position, whereby said lens is moved in said one direction to said home position to stop at said home position regardless of which side of said home position said lens was initially located.

17. Apparatus for controlling a lens of an image forming apparatus comprising operable means for moving said lens at a first speed from an initial position toward a home position to pass said home position, and control means for controlling said operable means such that said operable means reverses the direction of movement of said lens after said lens has past said home position and moves said lens at a second speed lower than said first speed to stop said lens at said home position.

18. Apparatus according to claim 17, wherein said control means controls said operable means to always move said lens in the same direction at said second speed to stop said lens at said home position regardless of which side of said home position said lens was initially located.

19. Apparatus according to claim 17, wherein said control means controls said operable means to move said lens in different directions at said second speed to stop said lens at said home position depending on which side of said home position said lens was initially located.

20. Apparatus according to claim 17, wherein said control means comprises sensor means for detecting said home position of said lens.

21. Apparatus according to claim 17, wherein said control means comprises a first sensor means to detect said home position when said lens moves at said second speed in one direction to stop at said home position, and second sensor means to detect said home position when said lens moves at said second speed in a direction opposite to said one direction to stop at said home position.

22. Apparatus according to claim 17, wherein said operable means comprises a stepping motor.

23. Apparatus according to claim 22, wherein said control means comprises a timer for controlling said stepping motor.

24. Apparatus according to claim 23, wherein said control means comprises phase change means for effecting a phase change for controlling said stepping motor.

25. Apparatus according to claim 17, wherein said operable means comprises a servomotor.

26. A method for moving a lens of an image forming apparatus from an initial position to a selected position comprising the steps of initially moving said lens at a first speed in one direction from said initial position until passing a home position, moving said lens at a second speed lower than said first speed in a direction opposite to said one direction to stop at said home position, and finally moving said lens at said first speed from said home position to said selected position.

27. A method for moving a lens of an image forming apparatus from an initial position to a selected position comprising the steps of initially moving said lens at a first speed from said initial position toward a home position to pass said home position, moving said lens at a second speed lower than said first speed to stop said lens at said home position, and finally moving said lens at said first speed from said home position to said selected position.

28. A method according to claim 27, wherein the movement of said lens at said second speed is always executed in the same direction.

29. A method according to claim 27, wherein the movement of said lens at said second speed is executed in one of two directions depending on which side of said home position said lens was initially located.

30. A method according to claim 27, wherein said step of moving said lens at said second speed to stop at said home position comprises moving said lens in the same direction irrespective of which side of the home position the lens was initially located.

31. A method according to claim 27, wherein said step of moving said lens at said second speed is executed in a direction opposite to the direction at which said step of initially moving said lens at said first speed was executed.

32. A method according to claim 27, wherein said lens is moved according to a first operational sequence when said lens is initially located on one side of said home position and said lens is moved according to a second operational sequence when said lens is initially located on the other side of said home position, said first operational sequence comprising (i) initially moving said lens at said first speed in one direction past said home position, (ii) moving said lens at said second speed in a direction opposite to said one direction to said home position to stop at said home position, and (iii) finally moving said lens at said first speed in said one direction from said home position to said selected position; said second operational sequence comprising (iv) initially moving said lens at said first speed in said opposite direction past said home position (v) moving said lens at said first speed in said one direction until the lens again passes said home position, (vi) moving said lens at said second speed in said opposite direction to said home position to stop at said home position, and (vii) finally moving said lens at said first speed in said opposite direction from said home position to said selected position, whereby said lens is moved in said opposite direction to said home position to stop at said home position prior to being moved to said selected position regardles of which side of the home position the lens was initially located.

33. A method according to claim 27, wherein said lens is moved according to a first operational sequence when said lens is initially located on one said of said home position and said lens is moved according to a second operational sequence when said lens is initially located on the other side of said home position, said first operational sequence comprising (i) initially moving said lens at said first speed in one direction past said home position, (ii) moving said lens at said second speed in a direction opposite to said one direction to said home position to stop at said home position, and (iii) finally moving said lens at said first speed in said one direction from said home position to said selected position; said second operational sequence comprising (iv) initially moving said lens at said first speed in said opposite direction past said home position, (v) moving said lens at said second speed in said one direction to said home position to stop at said home position, and (vi) finally moving said lens at said first speed in said opposite direction from said home position to said selected position.

34. A method according to claim 27, further comprising the step of utilizing a sensor for detecting said home position of said lens.

35. A method according to claim 27, further comprising the steps of utilizing a first sensor for detecting said home position when said lens is moved at said second speed in one direction to stop at said home position, and utilizing a second sensor for detecting said home position when said lens moves at said second speed in a direction opposite to said one direction to stop said lens at said home position.

36. A method according to claim 27, further comprising the step of utilizing a stepping motor for moving said lens.

37. A method according to claim 36, further comprising the step of controlling said stepping motor utilizing a timer.

38. A method according to claim 36, further comprising the step of controlling said stepping motor utilizing a timer and a phase changer.

39. A method according to claim 27, further comprising the step of utilizing a servo motor for moving said lens.

40. A method according to claim 27, wherein said steps as recited in claim 27 constitute a first operational sequence operable when said initial position and said selected position are on opposite sides of said home position, and further comprising the step of moving said lens according to a second operational sequence when said initial position and said selected position are both on the same side of said home position, said second operational sequence comprising moving said lens at said first speed from said initial position directly to said selected position without passing through said home position.

41. A method according to claim 40, wherein said second operational sequence comprises moving said lens in either one of two directions toward or away from said home position depending on the location of said initial position relative to said selected position.

42. Apparatus for moving a lens of an image forming apparatus from an initial position to a selected position comprising operable means for moving said lens at a first speed from an initial position toward a home position to pass said home position, and control means for controlling said operable means such that said operable means reverses the direction of movement of said lens after said lens has passed said home position and moves said lens at a second speed lower than said first speed to stop said lens at said home position followed by moving said lens at said first speed from said home position to said selected position.

43. Apparatus according to claim 42, wherein said control means controls said operable means to always move said lens in the same direction at said second speed to stop said lens at said home position regardles of which side of said home position said lens was initially located.

44. Apparatus according to claim 42, wherein said control means controls said operable means to move said lens in different directions at said second speed to stop said lens at said home position depending on which side of said home position said lens was initially located.

45. Apparatus according to claim 42, wherein said control means comprises sensor means for detecting said home position of said lens.

46. Apparatus according to claim 42, wherein said control means comprises a first sensor means to detect said home position when said lens moves at said second speed in one direction to stop at said home position, and second sensor means to detect said home position when said lens moves at said second speed in a direction opposite to said one direction to stop at said home position.

47. Apparatus according to claim 42, wherein said operable means comprises a stepping motor.

48. Apparatus according to claim 47, wherein said control means comprises a timer for controlling said stepping motor.

49. Apparatus according to claim 48, wherein said control means comprises phase change means for effecting a phase change for controlling said stepping motor.

50. Apparatus according to claim 42, wherein said operable means comprises a servomotor.

* * * * *